United States Patent [19]
Persmark et al.

[11] 3,935,324
[45] Jan. 27, 1976

[54] CREAM BASE FOR CONFECTIONARY USE
[75] Inventors: Ulf Persmark, Karlshamn; Jan-Erik Stenback, Morrum, both of Sweden
[73] Assignee: AB Karlshamns Oljefabriker, Karlshamn, Sweden
[22] Filed: Aug. 29, 1974
[21] Appl. No.: 501,672

[30] Foreign Application Priority Data
Sept. 4, 1973 Sweden............................ 73120032

[52] U.S. Cl. ................................................ 426/572
[51] Int. Cl.² ........................................... A23G 3/00
[58] Field of Search ........... 426/163, 195, 201, 363, 426/572

[56] References Cited
UNITED STATES PATENTS

| | | | |
|---|---|---|---|
| 3,194,666 | 7/1965 | Bedenk et al. | 426/201 |
| 3,208,857 | 9/1965 | Howard et al. | 426/163 |
| 3,253,928 | 5/1966 | Bedenk et al. | 426/163 |

Primary Examiner—Jeanette M. Hunter
Attorney, Agent, or Firm—Davis, Hoxie, Faithfull & Hapgood

[57] ABSTRACT

A ready-to-whip cream base comprising an emulsion formed of a fat phase and a water phase, the fat phase containing lecithin and the water phase including sugar and a preservative.

15 Claims, No Drawings

CREAM BASE FOR CONFECTIONARY USE

This invention relates to a cream base for confectionaries and bakeries having good storage properties and yielding after whipping a "light" cream with excellent over-run without further addition of foaming agents such as eggs, and which requires a comparatively short whipping time.

So called butter creams have long been used for fillings and decorations in the confectionary and bakery field. As a rule these butter creams are produced from butter or margarine to which has been added sugar, eggs and water, and optionally flavorings, such as chocolate, vanilla or fruit. The required mixing, is relatively time consuming, although a product is obtained, which, depending on the level of working up, certainly can reach a high volume. But it also has a very short storage time or "shelf-life," and therefore cannot be produced in amounts larger than what is intended to be used immediately.

Cream bases for confectionaries have been available, but in beating them it has been necessary to add egg or its equivalent as an auxiliary emulsifier and foaming agent. This is not advantageous for the aforementioned reasons.

Ready-prepared creams, which are water free for storage reasons, have also been produced. See, for example, U.S. Pat. No. 3,600,196.

Surprisingly, it has now been found that it is possible to produce a cream base containing fat, sugar and water in ready-to-use proportions, which, after whipping, gives an outstanding volume without the use of further whipping agents. This is accomplished by adding lecithin to a suitable fat, the lecithin comprising from about 0.5 to about 1.5% by weight of the fat, preferably about 0.6%. "Lecithin" refers to a commercial soybean lecithin such as "Yelkin", which is obtained as a by-product upon the extraction of oil from soybeans. The physical properties of the lecithin, for example its surface activity and emulsifying effects, are well known and are utilized in margarine and chocolate processing.

The effect here obtained, however, was not predictable. It has not been possible to obtain a similar effect by testing many more sophisticated emulsifiers and so called whipping agents, or emulsifier systems, as combinations of these are known. In most cases it has not been possible to obtain sufficient increase in volume during whipping, and even when this has been achieved, the taste and consistency have not been acceptable.

The composition of the fat base is of great importance in determining the consistency and taste of the cream. The most advantageous fat composition has been found to be 15-25% of coconut type fat, 30-50% hydrogenated fat, and 35-45% liquid vegetable oil. The hydrogenated fat component ought to be of the stable $\beta'$-crystallizing type, and it is sometimes preferable to form it as a mixture of two or more fats, hydrogenated to different melting points. The dilatation of the hydrogenated fat component, whether it be a single fat or a mixture, should preferably be as indicated below:

| Temperature (°C) | 10 | 20 | 30 | 35 | 40 |
|---|---|---|---|---|---|
| Dilatation (mm³/g) | 55–60 | 43–48 | 24–29 | 12–15 | 2–6 |

The fat base should preferably have a dilatation of at least 15 mm³/g at 20°C and not more than about 1–3 mm³/g at 35°C.

The cream base is prepared by first forming a fat phase and a water phase. The fat phase is prepared by melting the fat base, dissolving the lecithin in the fat, and thereafter after tempering to 40°–42°C. The water phase is prepared by dissolving sugar, salt and preservative in water in predetermined proportions, followed by tempering to 40°–42°C. An emulsion is then prepared by adding the water phase to the fat phase, under stirring, and thereafter continuing the stirring for an appropriate time. The prepared emulsion is cooled to 18°–20°C and worked in conventional tube-cooler equipment, such as the Votator-type, with A and B units, and packaged.

The preservative improves the storage properties. Usually sodium benzoate is used, in amounts ranging from about 0.03 to about 0.05% by weight of the end product.

It has been found that the cream base of the present invention may be stored for 3–4 months without significant off-flavor or other negative effects. After whipping for 10 minutes and increase in volume of at least 100% is obtained and 15 minutes of whipping will give an increase in volume of at least 150%.

It has also been found that further addition of sugar, preferably in powdered form, or water is possible without any significant changes in the original whipping properties.

Even the traditional addition of flavorings, such as cocoa or coffee powder, vanilla or fruit flavor, can be made more easily because of the melting properties of the lecithin present.

The invention is further demonstrated in the following examples where parts and percents represent parts by weight and percent by weight, unless otherwise wise stated.

EXAMPLE 1

A fat base was formed having the following composition:

20% coconut oil
 19% hydrogenated Mebra oil*
 22% hydrogenated fish oil**
 39% liquid groundnut oil

*New strains of rapeseed oil having medium erucic acid contents of 15–20% and a melting point of about 34°C.
Dilatation values for this oil after hydrogenation were as follows:

| Temperature (°C) | 20 | 30 | 35 | 40 |
|---|---|---|---|---|
| Dilatation (mm³/g) | 33 | 12 | 3 | 1 |

**This oil had a melting point of about 40°C and the following dilatation values:

| Temperature (°C) | 20 | 30 | 35 | 40 |
|---|---|---|---|---|
| Dilatation (mm³/g) | 60 | 38 | 25 | 10 |

569 kgms of the above fat base were melted and 3.5 kgms lecithin dissolved in the fat base. This fat phase was then tempered to 40°–42°C.

A water phase was then prepared by dissolving 220 kgms sugar, 7.5 kgms salt (NaCl), and 0.4 kgm sodium benzoate in 200 kgms water. This mixture was also tempered to 40°–42°C.

The fat phase was brought into a jacketed container and tempered to 42°–44°C. The water phase was added to the fat phase under stirring. When the entire water phase had been added the stirring was continued for an additional 10 minutes.

The resulting emulsion was then crystallized (cooled) and plastified (worked) in a scraped surface tube-cooler of Votator-type (A and B unit) to an exit temperature of 18°-20°C and packaged.

A sample of this product was tempered for 24 hours at 20°C and then whipped in a Hobart mixing unit (gear no. 2). A light and pleasant tasting cream was obtained, with an over-run (increase in volume) of 150% after 10 minutes of whipping. After a further 5 minutes of whipping, 190% over-run was obtained.

The reproducibility was determined by producing the above cream base in 21 separate experiments. Tests of the over-run after whipping of samples of these cream bases tempered to 20°C for 24 hours gave the following figures:

| Whipping time (min.) | Over-run (%) |
|---|---|
| 10 | 130–165 |
| 15 | 170–210 |

EXAMPLE 2

According to the procedure given in Example 1, a cream base was prepared having a higher sugar content. In this case the water phase consisted of 290 kgms sugar, 7.5 kgms salt and 0.4 kgm sodium benzoate dissolved in 150 kgms water.

The water phase was emulsified in 552 kgms of a fat phase of the same composition as that given in Example 1. A sample tempered for 24 hours at 20°C was whipped as described in Example 1 and gave a cream somewhat sweeter but still pleasant in taste and consistency.

The over-run was 130% after 10 minutes of whipping and 150% after 15 minutes.

EXAMPLE 3

A cream base prepared according to Example 1 was whipped after further addition of powdered sugar. Thus 250 g, 350 g and 450 g of sugar per kilogram of the original cream base were respectively added.

The following whipping results were obtained:

| Sugar addition (g) per kgm of cream base | Over-run (%) 10 min whip. | 15 min whip. |
|---|---|---|
| 250 | 150 | 170 |
| 350 | 140 | 160 |
| 450 | 130 | 150 |

All of the whipped creams above exhibited good appearance and a pleasant taste.

EXAMPLE 4

According to the procedure given in Example 1, a number of cream bases were prepared with differing water contents in the range of 15–30% water. The percentage of lecithin was kept at 0.35% at the lower water contents, and 0.7% at the higher. Sugar, salt and sodium benzoate contents were kept constant and the total balance was achieved by regulating the fat content. The composition of the fat base was the same as in Example 1.

Samples of the different cream bases were taken out and were tempered for 24 hours at 20°C before whipping tests were performed. The compositions, expressed in percent by weight, and test results are shown below:

| Ingredients (wt%) | A | B | C | D |
|---|---|---|---|---|
| Water | 15 | 20 | 25 | 30 |
| Fat | 61.86 | 56.86 | 51.51 | 46.51 |
| Lecithin | 0.35 | 0.35 | 0.70 | 0.70 |
| Sugar | 22.0 | 22.0 | 22.0 | 22.0 |
| Salt (NaCl) | 0.75 | 0.75 | 0.75 | 0.75 |
| Sodium benzoate | 0.04 | 0.04 | 0.04 | 0.04 |
| Over-run (%) | 190 | 180 | 150 | 120 |
| Remarks | none | none | Somewhat "thin" in consistency | Water leakage |

EXAMPLE 5

In order to investigate the ability to retain properties during storage, a number of samples prepared according to Example 1 were stored at 8°–12°C for 0–6 months. Every month a sample was taken out and tested with respect to whipping properties, organoleptic properties and bacteriological status.

| Storage time (months) | Over-run* (%) | Taste | Bacteriological content ($^{10}$log) Coli | Total |
|---|---|---|---|---|
| 0 | 200 | Without remark | — | 3.9 |
| 1 | 210 | " | — | 3.9 |
| 2 | 220 | " | — | 3.9 |
| 3 | 210 | A little off-flavor on surface | — | 2.7 |
| 4 | 210 | A little off-flavor on surface | — | 4.6 |
| 5 | 200 | Bad taste on surface | — | 4.9 |
| 6 | 200 | Bad taste of the whole sample | — | 4.8 |

*After tempering at 20°C for 24 hours; whipping time, 15 minutes.

EXAMPLE 6

A chocolate cream was prepared by adding 0.25 kgm of melted chocolate to 1 kgm of cream base prepared according to Example 1. The mixture was whipped for 15 minutes. A light and pleasant tasting chocolate cream with attractive appearance was obtained.

Similar trials were performed with cocoa and coffee powder. In these cases the sweetness had to be modified by an extra addition of powdered sugar.

The creams were judged as being very attractive by a test panel. The same estimates were given of similar creams containing various fruit flavorings and vanilla.

We claim:

1. A ready-to-whip cream base for confectionary use requiring no auxiliary emulsifiers or foaming agents, said cream base comprising from about 45% to 60% by weight of a fat phase, and a water phase; said fat phase comprising a fat base and lecithin, said fat base being composed of, by weight, from about 15% to about 25% coconut oil, from about 30% to about 50% hydrogenated oil of the stable $\beta'$-crystallizing type, and from about 35% to about 45% liquid vegetable oil, and said lecithin being present in a proportion of from about 0.5% to about 1.5% based on the weight of said fat base; and said cream base further comprising as part of said water phase from about 10% to about 35% water, from 15% to about 30% sugar and from about 0.03% to about 0.05% preservatives, based on the weight of said cream base.

2. The cream base of claim 1, said lecithin content being about 0.6 weight percent of said fat base.

3. The cream base of claim 1, including about 0.75 weight percent sodium chloride.

4. The cream base of claim 1, said preservative being sodium benzoate.

5. The cream base of claim 1, said fat base having a dilatation of at least 15 mm³/g at 20°C and not more than 3 mm³/g at 35°C.

6. The cream base of claim 1, said hydrogenated oil having the following dilatation properties:

| Temperature (°C) | 10 | 20 | 30 | 35 | 40 |
|---|---|---|---|---|---|
| Dilatation (mm³/g) | 55–60 | 43–48 | 24–29 | 12–15 | 2–6. |

7. The cream base of claim 6, said hydrogenated oil comprising a mixture of at least two oils hydrogenated to different melting points.

8. The cream base of claim 7 in which said hydrogenated oil is a mixture of hydrogenated fish oil and hydrogenated rapeseed oil.

9. A ready-to-whip cream base for confectionary use requiring no auxiliary emulsifiers or foaming agents, said cream base consisting of an emulsion having a fat phase content of about 57 weight percent and a water phase content of about 43 weight percent, based on said cream base;
    said fat phase having a fat base consisting of about 20 weight percent coconut oil, about 39 weight percent liquid vegetable oil, and about 41 weight percent hydrogenated oil, and containing about 0.6 weight percent lecithin, based on said fat base;
    said hydrogenated oil consisting of about 19 weight percent hydrogenated medium-erucic-acid content rapeseed oil having a melting point of about 34°C and about 22 weight percent hydrogenated fish oil having a melting point of about 40°C, based on said fat phase;
    said water phase consisting of about 20 weight percent water, about 22 weight percent sugar, about 0.75 weight percent salt, and about 0.04 weight percent sodium benzoate preservative, based on said cream base.

10. A process for preparing a ready-to-whip cream base for confectionary use requiring no auxiliary emulsifiers of foaming agents, said process comprising the steps of:
    forming a fat phase comprising between about 45% and about 60% by weight of said cream base by dissolving, at a first elevated temperature, from about 0.5% to about 1.5% lecithin in a fat base composed of a mixture of from about 15% to about 25% coconut oil, from about 30% to about 50% hydrogenated oil of the stable $\beta'$-crystallizing type, and from about 35% to about 45% liquid vegetable oil, all based upon the weight of said fat base;
    forming a water phase at a first elevated temperature by dissolving from about 15% to about 30% sugar and from about 0.03% to about 0.05% preservative in from about 10% to about 35% water, said sugar, preservative and water contents being based upon the weight of said cream base;
    emulsifying said water phase in said fat phase at a second elevated temperature; and
    crystallizing and plastifying said emulsion under cooling to about room temperature.

11. The process of claim 10, including the additional step of forming said hydrogenated oil by mixing at least two oils hydrogenated to different melting points.

12. The process of claim 10, including the additional step of mixing about 0.75 weight percent sodium chloride, based upon said cream base, into said water phase.

13. The process of claim 10, said first elevated temperature being from about 40°C to 42°C and said second elevated temperature being from about 42°C to about 44°C.

14. The process of claim 10, said fat base being formed so as to exhibit a dilatation of at least 15 mm³/g at 20°C and no more than 3 mm³/g at 35°C.

15. The process of claim 10, said hydrogenated oil being formed so as to exhibit the following dilatation range:

| Temperature (°C) | 10 | 20 | 30 | 35 | 40 |
|---|---|---|---|---|---|
| Dilatation (mm³/g) | 55–60 | 43–48 | 24–29 | 12–15 | 2–6. |

* * * * *